US012392178B2

(12) United States Patent
Kelch et al.

(10) Patent No.: US 12,392,178 B2
(45) Date of Patent: Aug. 19, 2025

(54) EMERGENCY EGRESS SAFETY SYSTEM

(71) Applicant: Legacy Barricades, Inc., Caledonia, MI (US)

(72) Inventors: Rickie Kelch, Caledonia, MI (US); Hunter Seelbinder, Fenton, MI (US); Debra Kelch, Caledonia, MI (US)

(73) Assignee: Legacy Barricades, Inc., Caledonia, MI (US)

( * ) Notice: Subject to any disclaimer, the term of this patent is extended or adjusted under 35 U.S.C. 154(b) by 78 days.

(21) Appl. No.: 18/322,891

(22) Filed: May 24, 2023

(65) Prior Publication Data

US 2023/0399880 A1 Dec. 14, 2023

Related U.S. Application Data

(60) Provisional application No. 63/351,370, filed on Jun. 11, 2022.

(51) Int. Cl.
*E05C 19/00* (2006.01)
*E05B 19/18* (2006.01)

(52) U.S. Cl.
CPC ............ *E05C 19/003* (2013.01); *E05B 19/18* (2013.01)

(58) Field of Classification Search
CPC .... Y10S 292/15; Y10T 292/34; Y10T 292/37; Y10T 292/65; Y10T 292/67; Y10T 16/61; E05C 19/188; E05C 19/003; E05C 17/59
See application file for complete search history.

(56) References Cited

U.S. PATENT DOCUMENTS

| | | | | |
|---|---|---|---|---|
| 2,553,732 | A | 5/1951 | Young | |
| 2,568,477 | A | 9/1951 | Westlund | |
| 4,198,088 | A | 4/1980 | Tochihara | |
| 4,585,259 | A | 4/1986 | Vidas | |
| 4,653,140 | A * | 3/1987 | Hudec | E05C 17/54 292/339 |
| 6,345,849 | B1 | 2/2002 | Yen | |
| 6,378,917 | B1 | 4/2002 | Jones | |
| 7,021,678 | B1 | 4/2006 | Raoult | |
| 7,065,830 | B2 * | 6/2006 | Bushey | E05C 17/54 16/85 |
| 8,708,378 | B2 | 4/2014 | Frazier | |
| 9,121,203 | B2 | 9/2015 | Muramatsu et al. | |

(Continued)

FOREIGN PATENT DOCUMENTS

GB 2588688 A * 5/2021 ........... E05B 47/023

*Primary Examiner* — Christine M Mills
*Assistant Examiner* — Yahya Sidky
(74) *Attorney, Agent, or Firm* — Gardner, Linn, Burkhart Ondersma LLP

(57) ABSTRACT

An emergency egress safety system for a door to a protected room, the emergency egress safety system includes a base, the base for straddling an edge of a door and having a first portion for locating on a side of the door facing outside the protected room and a second portion for locating on a side of the door facing the protected room, an arm mounted relative to the base, the arm being mounted to the base for movement between a stowed position and a deployed position where the arm is extended from the base and is automatically locked in the deployed position to block the door that is straddled by the base, and at least one actuator located at the first portion operable to unlock the arm to allow the arm to return to its stowed position.

11 Claims, 20 Drawing Sheets

(56) References Cited

U.S. PATENT DOCUMENTS

| | | | | |
|---|---|---|---|---|
| 9,518,421 | B2 | 12/2016 | Cushwa, Jr. et al. | |
| 9,562,377 | B2 | 2/2017 | Attard | |
| 9,799,181 | B2 | 10/2017 | Cushwa, Jr. et al. | |
| 10,094,154 | B2 | 10/2018 | Ploskunak | |
| 10,174,532 | B2 | 1/2019 | Couturier | |
| 10,726,697 | B2 | 7/2020 | Thiel et al. | |
| 11,041,333 | B2 | 6/2021 | Couturier | |
| 11,105,130 | B2 | 8/2021 | Seelbinder et al. | |
| 2009/0058104 | A1 | 3/2009 | Huang | |
| 2014/0217754 | A1 | 8/2014 | Taylor et al. | |
| 2014/0312634 | A1* | 10/2014 | Cushwa, Jr. | E06B 9/02 292/340 |
| 2018/0320423 | A1* | 11/2018 | Middlestadt | E05C 17/54 |
| 2020/0399940 | A1* | 12/2020 | Rivard | E05C 19/003 |

* cited by examiner single direction door - opening inwardly single direction door - opening outwardly

EMERGENCY EGRESS SAFETY SYSTEM

CROSS REFERENCE TO RELATED APPLICATION

The present application claims priority of U.S. provisional application Ser. No. 63/351,370, filed on Jun. 11, 2022, which is incorporated herein by reference in its entirety.

FIELD AND BACKGROUND

The present disclosure is directed to doorway egress locking systems, and in particular an emergency egress safety system that permits safe emergency egress.

Conventional door lock systems provide minimal security in lock down situations. Conventional door lock systems are often quickly breached or easily disabled from the outside of the door rendering them useless for impeding or stopping intruders.

Retractable or telescoping bollards are known for generating barricades to prohibit vehicles from entering restricted areas or thoroughfares.

SUMMARY OF THE DISCLOSURE

The present disclosure provides an emergency egress safety system for securing or barricading a door in emergency situations, such as an active shooter situation, and a method for using the system. The emergency egress safety system may be used with an out-swing or outwardly swinging door that opens outwardly from the room to be protected, such as opening outwardly into a hallway or other room outside the room to be protected. Alternatively the emergency egress safety system may be used with an in-swing or inwardly swinging door that opens inwardly into the room to be protected. As another alternative the emergency egress safety system may be used with a door that swings in both directions and may open inwardly into the room to be protected or outwardly from the room to be protected, such as opening outwardly into a hallway or other room outside the room to be protected.

An emergency egress safety system forms a door barricade system to position relative to a door. The emergency egress safety system is located adjacent an edge of a door, such as on or in the floor, to position a barricade arm in a deployed and locked position in order to block and barricade the door from opening when the emergency egress safety system is in its blocking configuration. The emergency egress safety system may capture the door by positioning a barricade arm on both sides of the door to be protected, or by positioning a barricade arm on one side of the door to be protected that is the side that the door normally opens into when being opened. The emergency egress safety system is converted into its locking configuration by moving the arm into its deployed position, which may automatically triggering the emergency egress safety system to locked the arm in its deployed position in which the arm blocks the door from opening. Once the threat or locked-down situation is resolved, the arm is configured to be moved back into its stowed position in which the arm is no longer blocking the door from opening.

In one form, an emergency egress safety system includes a base and an arm mounted relative to the base. The arm is mounted to the base for movement between a stowed position and a deployed and locked position where the arm is extended from the base to block a door that is adjacent the emergency egress safety system. The emergency egress safety system also includes at least one actuator that when operated unlocks the arm to allow the arm to return to its stowed position. The emergency egress safety system also includes an actuator that when triggered allows the arm to return to its stowed position.

The emergency egress safety system also may include a second actuator that when triggered allows the arm to return to its stowed position.

In one aspect, the base is configured to straddle an edge of the door, with one actuator located on one side of the base for locating the actuator on one side of the door, and with the second located on another side of the base for locating the key the other side of the door.

In one aspect, the base includes a rod that locks the arm when in its deployed position. For example, the arm is mounted for pivotal movement relative to the base about a pivot axis to move between its stowed position and its deployed position. The rod may be mounted to the base adjacent the arm for linear movement along a longitudinal axis parallel to the pivot axis from a non-locking position to a locking position when the arm is pivoted to its deployed position to thereby lock the arm in its deployed position.

Further, the rod may have an engagement surface that when aligned with the arm blocks the arm from pivoting when in its deployed position. When triggered, the actuator is configured to move the rod where the engagement surface is no longer aligned with the arm to allow the arm to pivot to its stowed position. Similarly, when operated the second actuator is also configured to move the rod to its non-locking position where the engagement surface is out of alignment with the arm to allow the arm to pivot back to its stowed position.

In one aspect, the base is configured to be positioned in or on a wall or floor to be directly next to a door to be protected when the door is in a closed position. When in a storage configuration, the emergency egress safety system is unobtrusive and does not impede the traffic of people walking or moving through the doorway, especially when the emergency egress safety system is recessed in the floor. When the emergency egress safety system is in its blocking configuration, the arm is raised into its deployed position in which an arm may be located on one or on both sides of the door in order to prevent the door from being opened.

In one aspect, the emergency egress safety system may provide a system in which the arm is moved its deployed position by triggering a third actuator.

In any of the above, a suitable actuator may be a button or a key. For example, in the case of the third actuator, the actuator may be flush mounted in the base so that it is not inadvertently triggered to release deployment and locking of the arm or arms.

Thus, the emergency egress safety system provides an arm that can be automatically locked in its deployed position in response to a user moving the arm to its deployed position. Once deployed and locked, the arm cannot be readily moved out of its deployed and locked position and the door cannot be opened. The actuator may be configured to release the arm from its deployed and locked position. In this manner, should the emergency egress safety system be triggered to lock the arm in its deployed position to block a door from opening, the arm may be released from its deployed and locked position in order to allow the protected door to open and otherwise operate in its normal fashion.

As noted above, the arm may be released from its deployed and locked position by a person located outside the protected room by use of a tool that operates on the actuator and allows the door to open in the conventional fashion.

In any of the above, a suitable arm may be a metal member with a rectangular cross-section, including a uniform cross-section and, hence, be formed from a metal bar. Alternately, the arm may formed from an L-shaped member with two legs—with one of the legs pivotally mounting the arm to the base and the second leg providing the blocking function. In each case, the leg may be formed from a metal bar with a uniform cross-section. Further, the emergency egress safety system may include two arms. For example, the two arms may be joined together and form a U-shaped member that straddles the edge of the door to be protected, or they may be independent with each one deployed together or independently. In this manner, when deployed, the two arms are located on opposite sides of the door and capture the door there between when raised into their deployed and locked positions.

In another aspect, the base may have a footprint with the arm or arms remaining within the foot print of the base when deployed and when stowed. Further, the base may have an upper outer surface and a lower outer surface, with the arm or arms pivotally mounted to the base between the upper and lower outer surfaces and moved and fully contained between the upper and lower outer surfaces when moved to its or their stowed positions.

In a further aspect, the base may comprise a plate which defines the footprint and forms the upper and lower outer surfaces. For example, the arm or arms may be moved to where they flush with the upper outer surface the base to form a compact and low profile emergency egress safety system that can be easily located under a door, or in the wall surrounding the door, so that it does not form an obstruction through the door.

In one aspect, one of the actuator or access to one of the actuators of the emergency egress safety system is located outside the room to be protected. For example, the actuator may require a key or a dedicated or unique tool to be used by appropriate rescue or other authorized personnel in order release the emergency egress safety system from its locked or barricade configuration. The unique tool may be customized to a particular one of the barricades or to a set of barricades to be installed in a single facility, as such, a bad actor may be unprepared or unable to disengage the barricade system from outside of the room to be protected, thereby reducing the opportunity for the bad actor to bypass the barricade.

In one aspect, an emergency egress safety system includes a base with a pivotal arm pivotally mounted to the base, which is pivotal from a stowed position within the base to a deployed and locked position at least partially extended. The base may be configured to be fully recessed or partially recessed in a floor or mounted on the floor beneath a door to be barricaded. The arm may be pivoted upwardly from the base to its deployed and locked position adjacent a side of the door to be protected.

Alternatively, the emergency egress safety system may be used at the side of the door and protected with the arm when moved laterally outwardly into its deployed and locked position. For example, the emergency egress safety system may extend laterally from the door jamb or passageway to engage with the door to be protected. Once in place in its deployed and a locked position, the door will be blocked from opening and secure the room to protect the person or persons in the protected room.

The emergency egress safety system also includes a locking member that locks the arm or arms. The locking member is configured to be selectively or automatically moved into a locking position where the locking member moves the arm to its deployed and locked position. When in its locking position, the locking member may prevent the arm from being pivoted or otherwise moved back into its storage position. The locking member may also allow the arm to be disengaged and allow the arm to be pivoted or otherwise moved into its storage position.

The emergency egress safety system may also include an actuator located outside of the protected room and requires a release tool to operate the actuator to unlock the barricade system with a mating tool from outside the protected room. The actuator may be located in a socket or other specially formed recess in the base to allow authorized personnel to unlock the emergency egress safety system through the socket or recess using the tool. The emergency egress safety system may also include an actuator at the base within the protected room, or other secure location, to trigger the locking member to lock and/or release the arm.

For example, the locking member may be formed by a rod that is rotatably mounted adjacent the arm or arms. In one aspect, each arm is mounted for pivotal movement relative to the base about a pivot axis to move between its stowed position and its deployed position. The rod may be mounted to the base adjacent the arm or arms for linear movement along a longitudinal axis parallel to the pivot axis from a non-locking position to a locking position when the arm is pivoted to its deployed position.

In a further aspect, the rod has an engagement surface(s) for blocking the arm(s) from moving to its (their) deployed and locked position (s). For example, the rod may have a circular cross-section with a notch that is sized to receive the arm or arms or a notch for each arm so that when the rod is moved to where the notch or notches align with the arm or arms, the arm or arms can moved to their stowed position or positions, for example, under the force of gravity or a biasing member, such as a spring, including a coil spring. When the rod is moved to where the notch or notches are not aligned with the arm or arms, the outer surface of the rod will block the arm or arms pivoting to its or their deployed position or positions.

In one embodiment, the rod is biased by a spring to its locking position so that when the biasing member or members are pivoted to their deployed positions, the rod is moved under the force of the spring to allow the emergency egress safety system to be deployed to its locking configuration.

In any of the above, a suitable arm may be a metal member with a rectangular cross-section, including a uniform cross-section and, hence, be formed from a metal bar. Alternately, the arm may formed from an L-shaped member with two legs—with one of the legs pivotally mounting the arm to the base and the second leg providing the blocking function. In each case the leg may be formed from metal bars with a unformed cross-section. Further, the emergency egress safety system may include two arms. For example, the two arms may be joined together and form a U-shaped member that straddles the edge of the door to be protected, or they may be independent with each one deployed together or independently.

In any of the above, the arm or arms are operable to be oriented in a flat orientation within the base to allow the protected door to open in its normal fashion. The arm may be positioned so that is located on the inside of a protected door that opens by swinging open inwardly. When used with a door that opens by swinging open outwardly, the arm may be positioned so that it is located on the outside of the protected door when barricaded. As another embodiment, as noted above, there may be two arms and two joined arms that form a “U” shaped member that has its lower extent pivotally mounted to the base and its two depending legs positioned to be located on opposite sides of the door and capture the door there between when pivoted or otherwise raised into the employed and locked position.

The base and arms are each defined by a rigid material, such as steel, carbon fiber, composite or high impact resistant plastic or the like. The arms may be formed from one contiguous piece of the rigid material. Each arm is defined by a bottom portion (which pivotally mounts the barricade on the base) and either one or two leg portions, such that the leg portion or leg portions extend at an obtuse angle, such as perpendicularly, from the bottom portion. The bottom portion of the arm has a thickness that is less than the space between the door and the adjacent surface, such as a floor, a wall, a door jamb, or the like, such that the arm does not engage or contact the adjacent surface when the door lock system is positioned beneath or to the side of the door and may be pivoted into a locked condition.

In an embodiment, an emergency egress safety system is configured as a floor module, which is configured to sit recessed in a floor adjacent a door to a protected room and with an upper outer surface flush with the floor. An arm having a pivot axle mounts the arm in the floor module and is movable from a stowed position where the arm is flush with the floor and a deployed locked position where it forms a barrier to stop the door from opening. The floor module includes a locking rod that extends from a position outside the protected room and is moveable between a locking position where it locks the arm in its deployed position and a non-locking position where the arm can return to its stowed position. The floor module includes a biasing member, such as a spring, which urges the rod into its locking position where it locks the arm in its deployed position. The locking rod is configured to be moved out of its locking position and to allow the arm to be pivoted into its storage position.

In an embodiment, the arm may be activated manually to move to its deployed position alongside the protected door, and once so positioned a spring-driven locking device, such as a locking rod, is operated to lock the position of the arm.

In another aspect, the actuator, when trigger, operates against the spring force to move the locking rod into its non-locking position. For example, the actuator may comprise a spring button that is depressed to move the locking rod to its non-locking position.

In one example of use, a classroom teacher may manually pivot the arm into a deployed position and thereby prompt the locking member to move into an engaged or locking position in which it impedes movement of the arm, thus locking the position of the arm into its deployed position. Thus, the barricade and locking members cooperate to barricade the door. Once a threat or emergency situation is resolved (or if the arm was unnecessarily activated) the teacher may release the arm, for example via a release button, from its deployed and locked position to allow the door to open normally.

In the event the arm is unable to be unlocked from the interior of the room to be protected (e.g. no personnel inside the room is capable of disengaging the arm with the release button) an authorized person (e.g. an emergency responder) may release the arm from its locked deployed position and open the protected door from outside the protected room by employing a release tool outside the room to withdraw the locking rod and release the arm. For example, the emergency egress safety system may have an access point (e.g. to an internal (within the base) with unlocking mechanism, which incorporates a push and turn mechanism or method that requires a user to insert a tool, depress the unlocking member of the push and turn mechanism, and then turn the unlocking member of the push and turn mechanism to move the locking rod away from it locked position. Thus, the emergency egress safety system may incorporate a unique release sequence that is not necessarily intuitive or readily performed by untrained personnel.

In another example of use, a classroom teacher may manually pivot the arm into a deployed position and thereby prompt a locking button or mechanism to lock it in its deployed position. When the threat condition is abated, an authorized person may release the barricade system and open the protected door from outside the protected room by employing a release tool at an access point outside the room to withdraw the locking rod and release the arm. Alternatively, from within the protected room a person may disengage the locking rod in order to provide the arm with the ability to be pivoted back into a storage position in the floor or door jamb of the protected room.

Thus, the emergency egress safety system in the form of a barricade is provided in a self-contained embodiment that is coupled to a floor, door jam, etc. adjacent the door, and therefore is not physically attached or fixed to the door itself. The barricade only engages or contacts the door when the arm is moved to its deployed and locked position.

DESCRIPTION OF THE PREFERRED EMBODIMENTS

Figure 1:
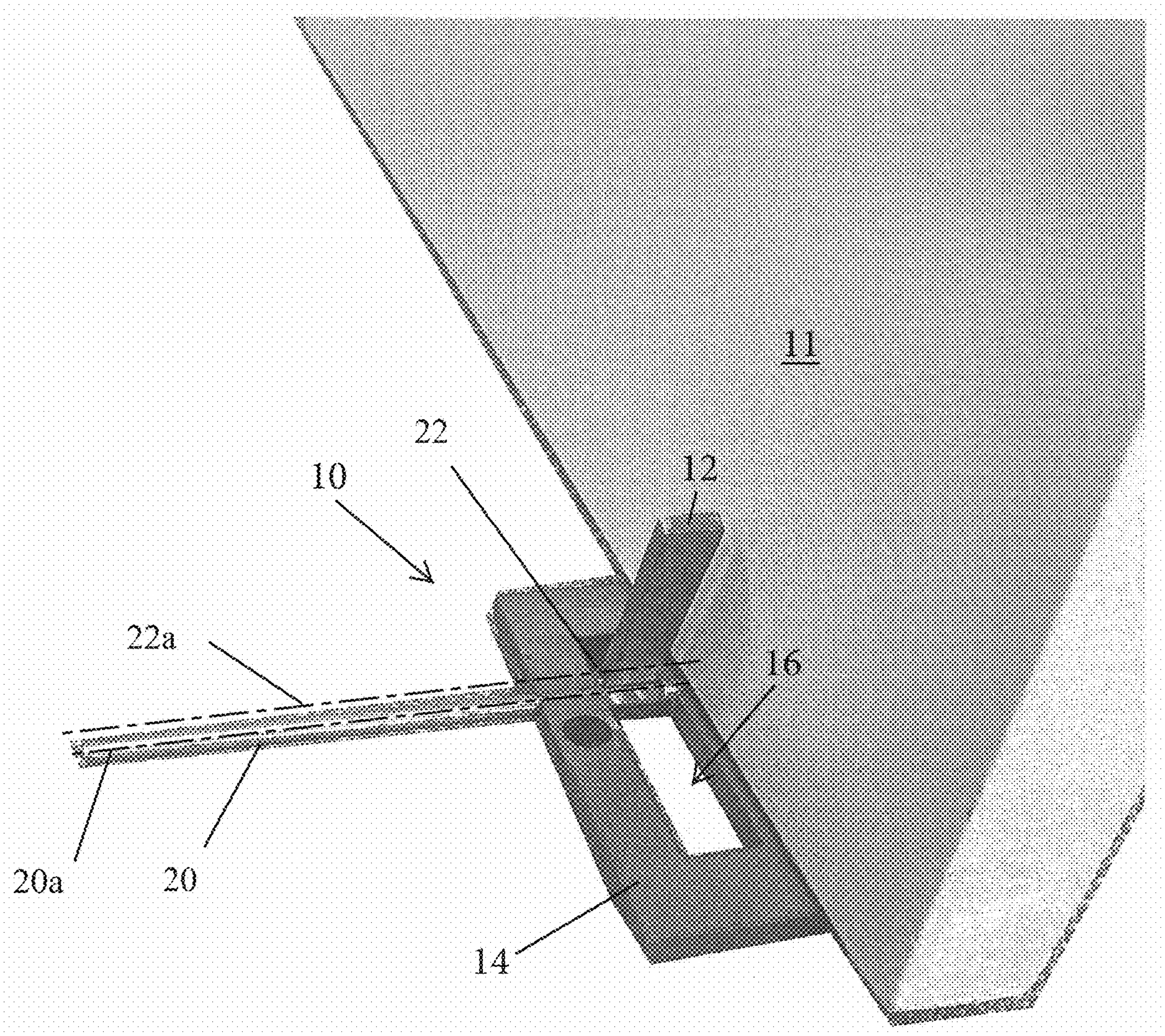
FIG. 1 is a perspective view of an emergency egress safety system shown in a deployed configuration under a door.
Figure 2:
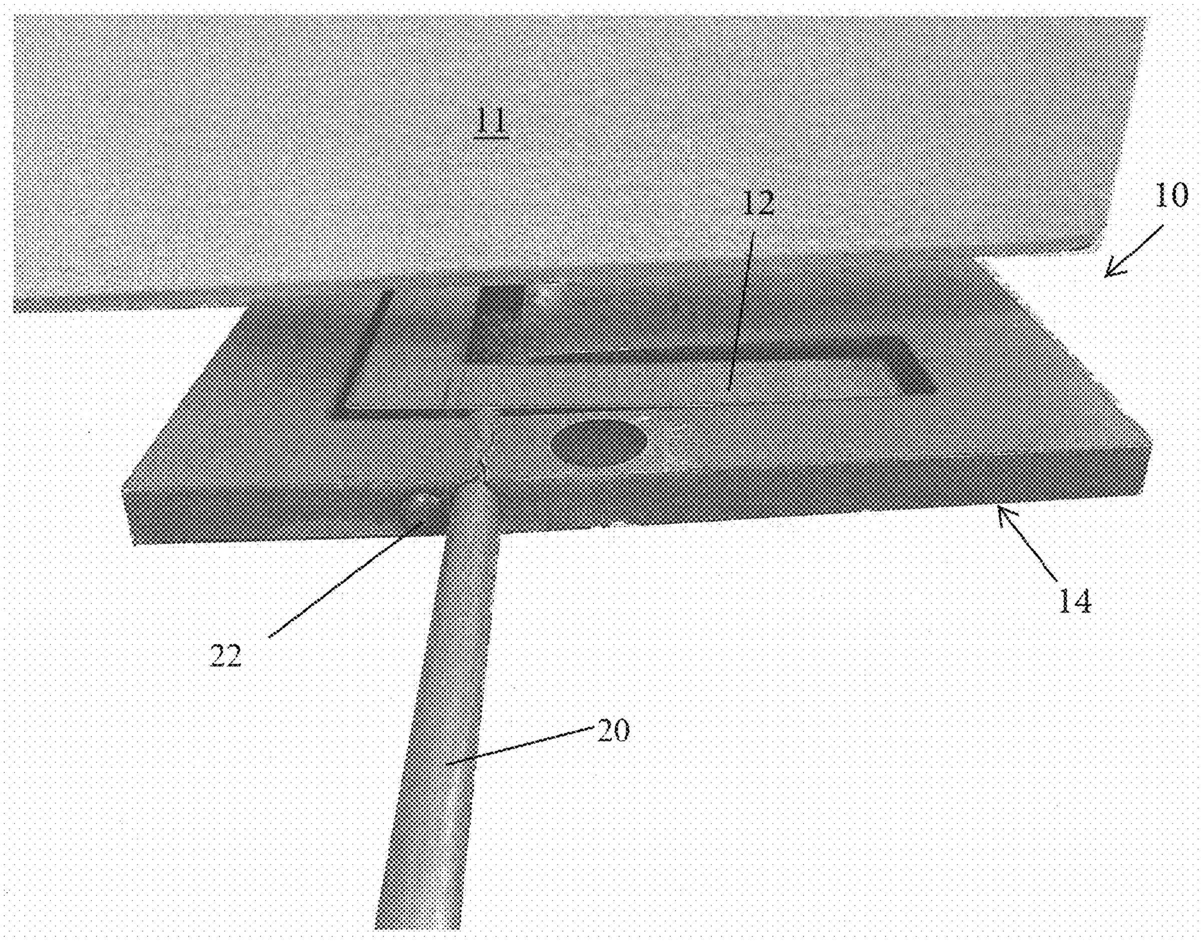
FIG. 2 is another perspective view of the emergency egress safety system shown in a deployed configuration under a door.

Referring now to the drawings and the illustrative embodiments depicted therein, an emergency egress safety system 10 is configured for limiting access to a protected area (e.g. a classroom) by barricading a door 11 to the area while permitting an emergency responder to disable the emergency egress safety system from an exterior side of the door (FIG. 1) to provide access to the protected area. As will be more fully described below, the emergency egress safety system 10 forms a door barricade system and positions an arm 12 adjacent an edge of a door and deploys the arm 12 from a stowed position to a deployed and locked position in order to block and barricade the door from opening when the emergency egress safety system is in its blocking configuration.

Referring to FIGS. 1-5, emergency egress safety system 10 includes a base 14 and an arm 12 that is pivotally mounted to the base 14. The arm 12 is mounted to the base 14 for movement between a stowed position (see e.g. FIG. 2) and a deployed and locked position (FIG. 5) where the arm 12 is extended from the base 14 to block the door 11 that is adjacent the emergency egress safety system 10.

Figure 3:
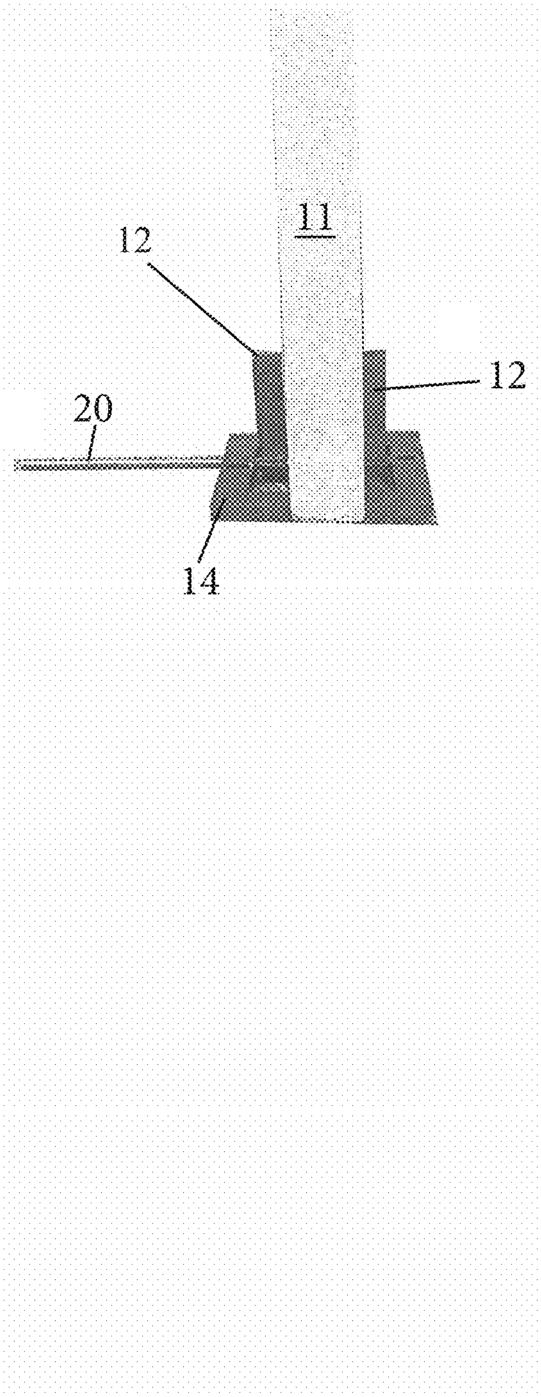
FIG. 3 is another perspective view of the emergency egress safety system shown in a deployed configuration under a door.
Figure 4:
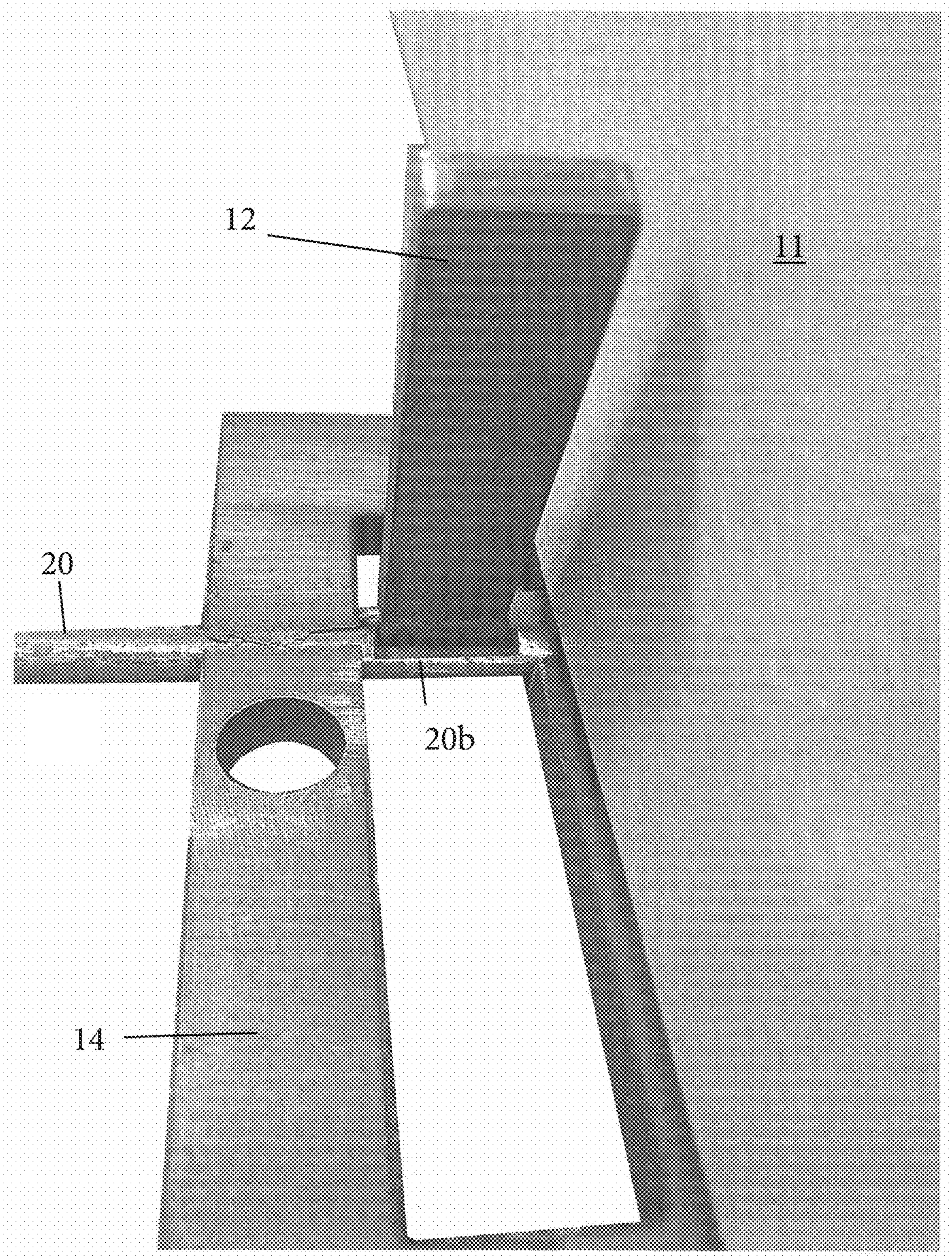
FIG. 4 is another perspective view of the emergency egress safety system shown in a deployed configuration under a door.

As best seen in FIG. 3, emergency egress safety system 10 is configured to be located under a door, with base 14 straddling a bottom horizontal edge of the door and supporting arms 12 on both sides of the door so that when moved to their deployed positions, the arms 12 barricade the door in both directions. It should be understood that a single arm may be used in the case of a door that swings only one way, such as described below in reference to FIGS. 17-23. Further, although illustrated as being mounted to the floor beneath the door, emergency egress safety system 10 may be mounted in a wall, e.g. in the door jam, adjacent the door, including adjacent the vertical edge or upper horizontal edge of the door.

Optionally, emergency egress safety system 10 may be mounted in a recess formed in the mounting surface, such as the floor or wall, so that it is flush or at least partially recessed in the mounting surface and minimizes any inference with passageway through the door opening. Alternately, emergency egress safety system 10 may be surface mounted on the mounting surface, e.g. floor or wall, but is configured with a low profile and, optionally, with a ramped or tapered profile to remain unobtrusive and not form a tripping hazard or impediment to the passageway through the door opening.

To deploy arm or arms 12, the arm or arms 12 may be simply raised up manually and then locked in their deployed position automatically. For example, arms 12 may have a tether or spring assist to help raise the barrier arms from their stowed positions. Alternately, the arm or arms 12 may be retained within base 14 by a latch and biasing member, such as a spring, which when the latch is released allows the spring to move the arm or arms 12 to their deployed positions, and then locked in place automatically, as described below. Further optionally, an electric driver, such as a solenoid or rotary motor or linear actuator may be used, once powered, to move the arm or arms 12 to their deployed positions.

As will be more fully described in reference to FIGS. 25, 26, and 26A-D, emergency egress safety system 10 also includes a lock release actuator 16, which allows a person inside the protected room to release the automatic locking of the arm or arms and a second lock release actuator 18 (see FIGS. 26 and 26B) that is located outside the protected area where it is accessible by emergency personnel, which when operated allows the arm 12 to be unlocked and move to its stowed position within base 14. Further, as noted, emergency egress safety system 10 may have two arms 12 or a single arm 12, such as shown in the figures.

Referring to FIGS. 1-9, 12, and 14, emergency egress safety system 10 includes a locking rod 20 that may be manually or automatically moved into position to lock the arm 12 or arms 12 once in their deployed positions. For ease of description of locking rod 20, some of the following description will be made to a single arm, but it should understand that the locking rod 20 can be configured, as shown, to lock two arms.

Optionally, the locking rod 20 is spring-loaded by a spring 25 to its locking position (see FIG. 26) such that when the arm 12 is moved into its deployed position, the locking rod 20 is automatically urged into the locking position to block the arm 12 from rotating out of its deployed position. In this manner, when used in an educational setting, a teacher or other educational user may simply manually lift the arm 12, so that the locking rod 20 automatically moves to block the barrier arm 12 from returning to its stowed position and thereby barricade the door.

Figure 5:
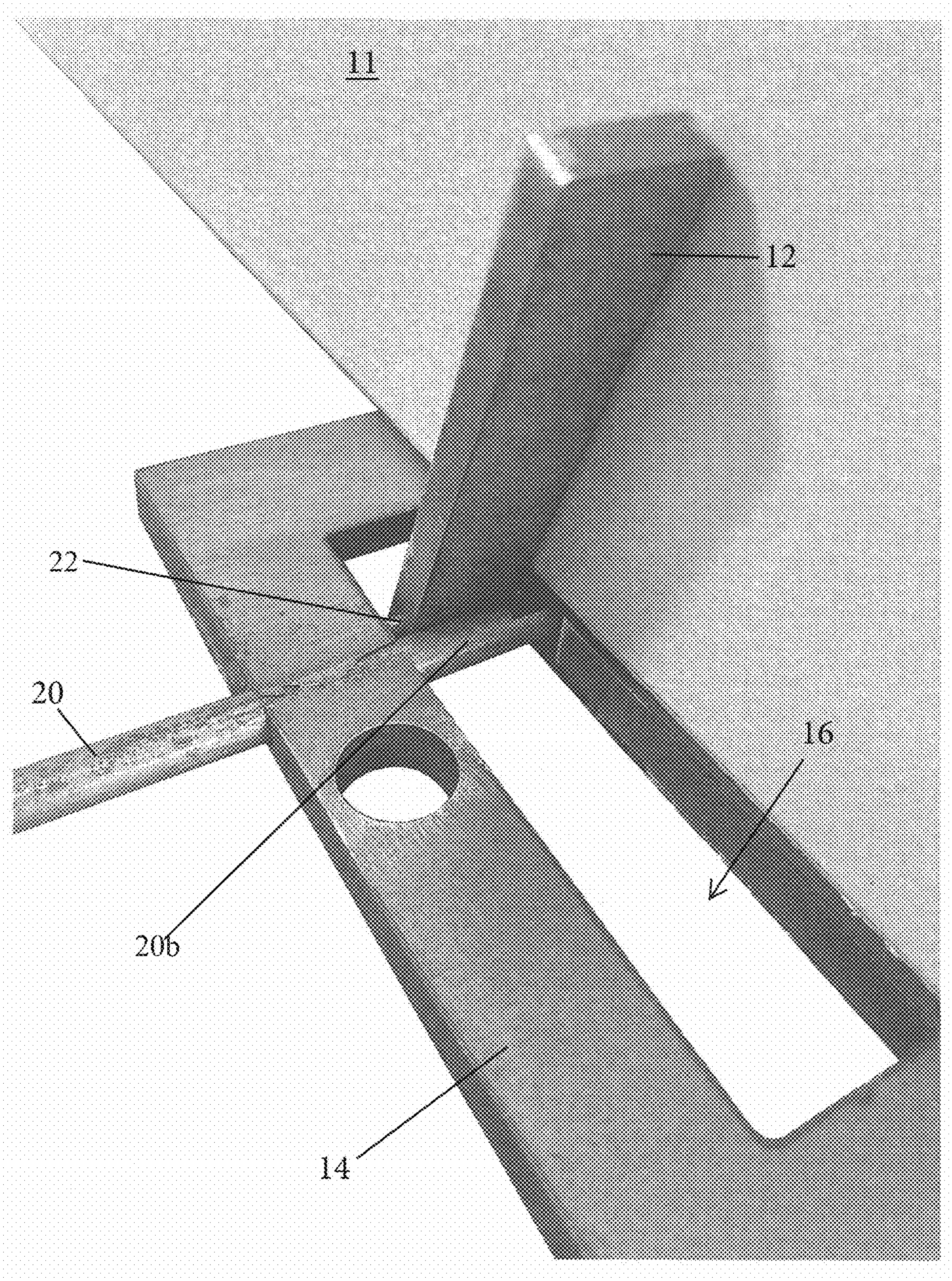
FIG. 5 is another perspective view of the emergency egress safety system shown in a deployed configuration under a door.
Figure 12:
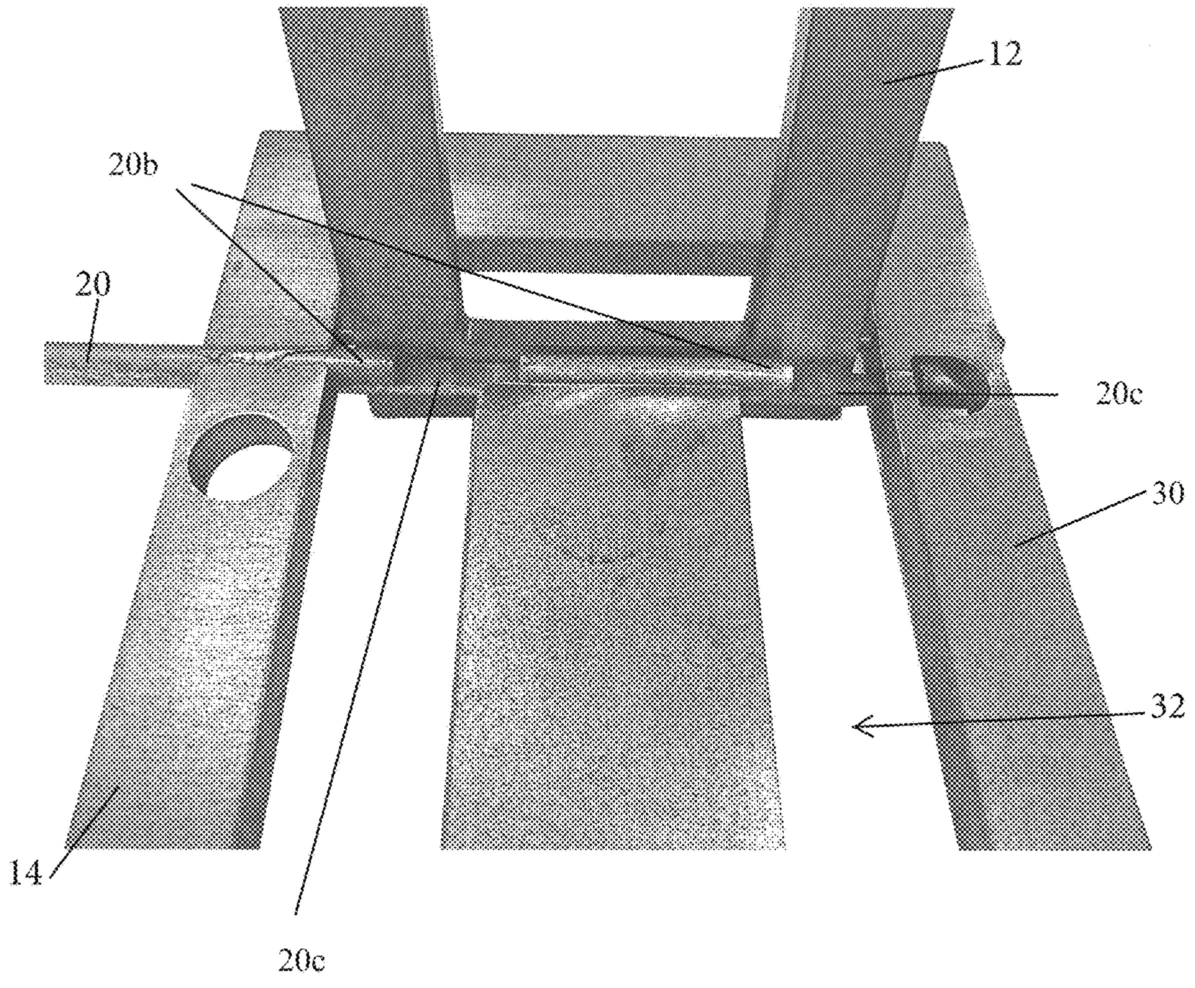
FIG. 12 is another enlarged perspective view of the emergency egress safety system shown in a deployed configuration.
Figure 14:
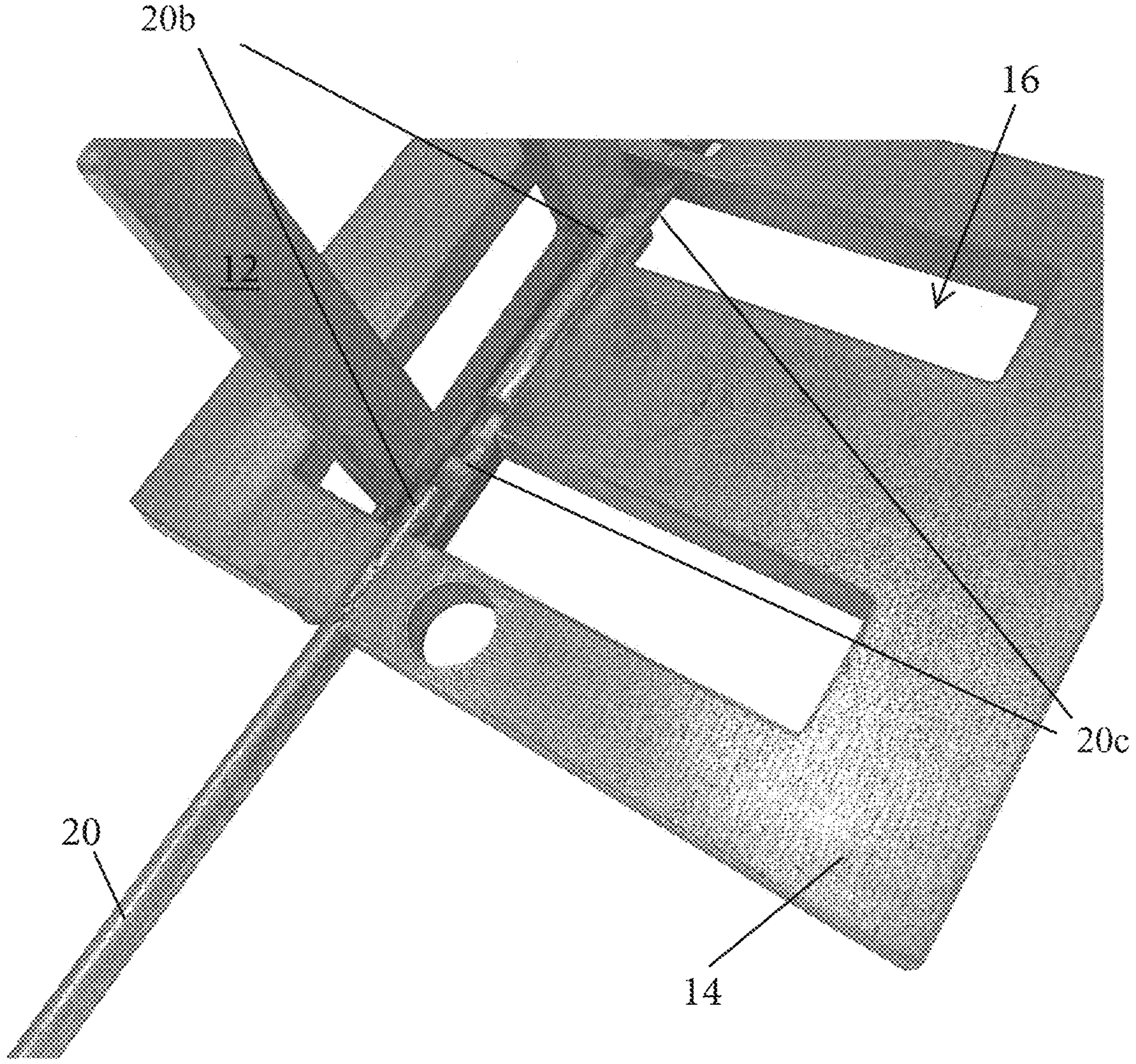
FIG. 14 is another enlarged perspective view of the emergency egress safety system shown in a deployed configuration.
Figure 15:
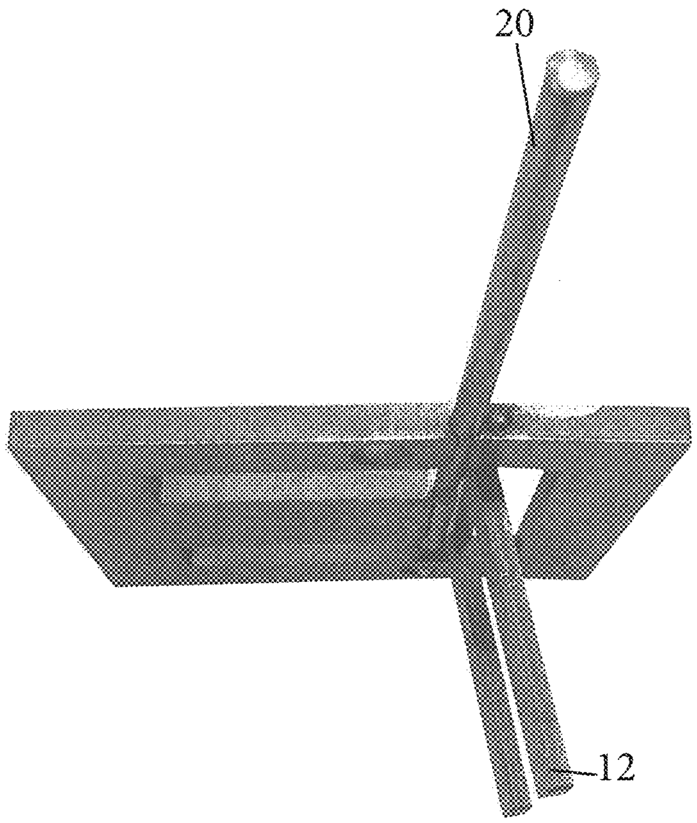
FIG. 15 is another perspective view of the emergency egress safety system shown in a deployed configuration.
Figure 16:
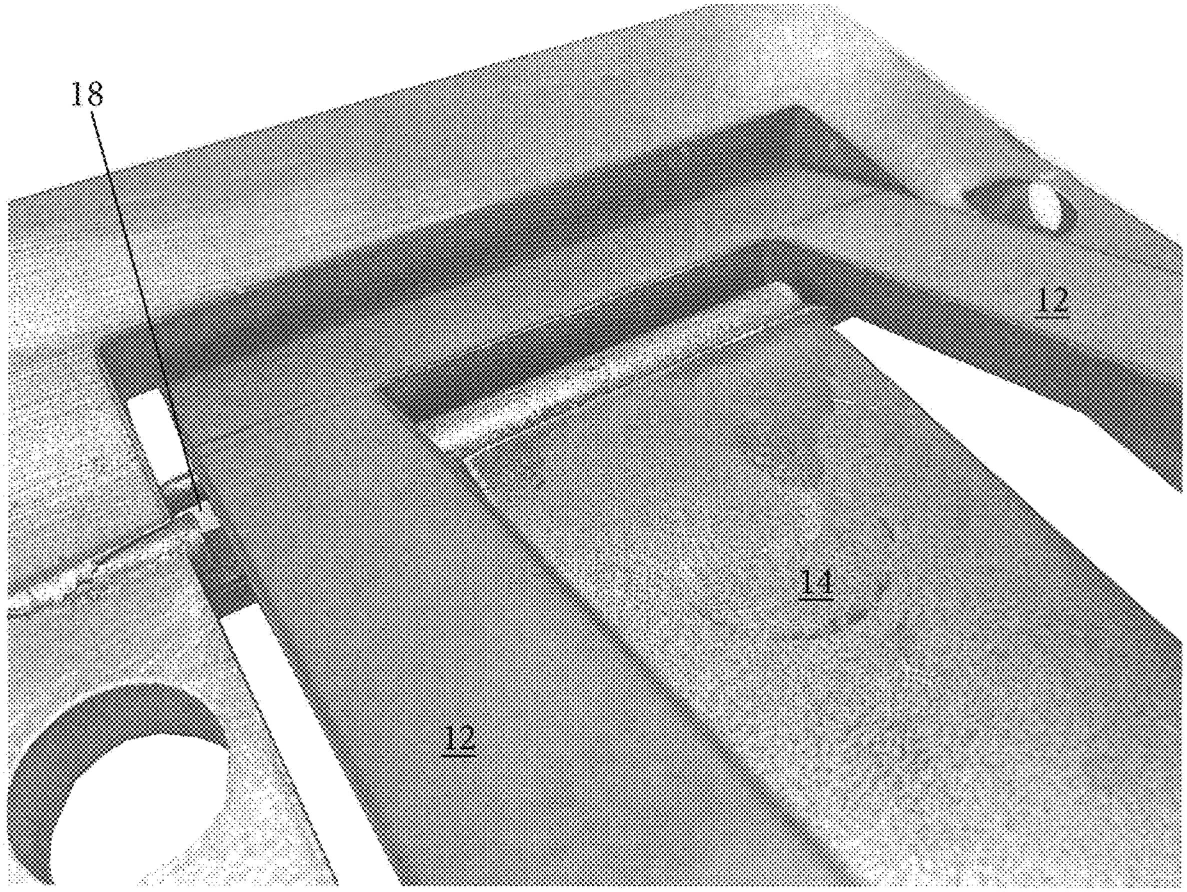
FIG. 16 is another enlarged perspective view of the emergency egress safety system shown in a deployed configuration.
Figure 17:
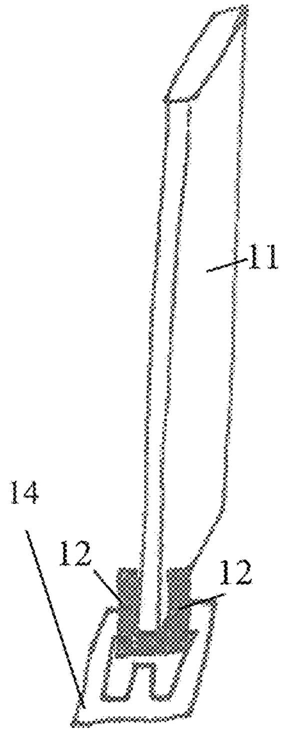
FIG. 17 is an end perspective view of a door with the emergency egress safety system shown in a deployed configuration under the door.
Figure 18:
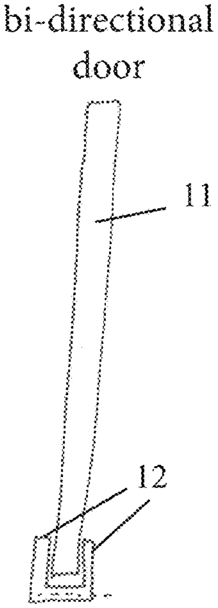
FIG. 18 is an elevation view of door with the emergency egress safety system shown in a deployed configuration adjacent an edge of the door.
Figure 19:
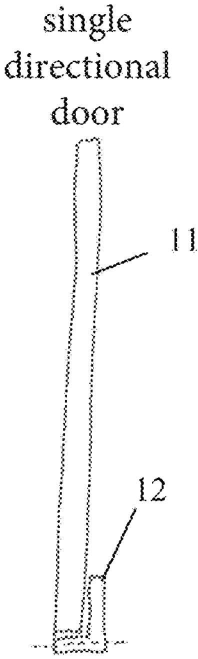
FIG. 19 is an elevation view of door with another embodiment of the emergency egress safety system shown in a deployed configuration adjacent an edge of the door.

As best seen in FIGS. 5, 12 and 14, locking rod 20 is supported in or on base 14 and locks the barrier arm 12 in its deployed position once the locking rod 20 is moved to its locking position. For example, the arm 12 may be mounted for pivotal movement relative to the base 14 by one or more pivot axles 22 about a pivot axis 22*a* to move between its stowed position and its deployed position. The locking rod 20 may be mounted to the base 14 adjacent the arm 12 or arms 12 offset from pivot axis 22*a* and for linear movement along a longitudinal axis 20*a* parallel to and spaced from the pivot axis 22*a* of the arm 12. In this manner, locking rod 20 may be moved laterally through base 14 adjacent arm 12 from a non-locking position to a locking position when the arm 12 is pivoted to its deployed position. When locking rod 20 is moved to its non-locking position, the arm 12 may return to its stowed position under the force of gravity or under the force of a spring, such as a torsional spring mounted about pivot axle 22.

Lock release actuator 16, when triggered, is configured to move locking rod 20 to its non-locking position. Similarly, when operated, lock release actuator 18 is configured to move the locking rod 20 to its non-locking position, but via access outside the protected room. As best seen in FIGS. 12 and 14, in order to block arm 12 in its deployed position, locking rod 20 may have an engagement surface 20*b* that when aligned with the arm 12 prevents the arm pivoting to its deployed position. Thus, when lock release actuator 16 or actuator 18 is triggered, locking rod 20 is moved out of its locking position where the engagement surface 20*b* is out of alignment with the arm 12 to allow the arm 12 to pivot back to its stowed position in recess 20*c* and within base 14.

The engagement surface 20*b* may simply be the outer surface of the rod—for example, in the case of a round rod, the outer circumference of the rod. To allow the arm 12 to return to its stowed position, a portion of the rod may be removed to form a recess that is sized to form a receptacle to receive the arm 12 therein, which when aligned with the arm 12 allows the arm 12 to pivot back down to its stowed position and, further, to lay flat within the base 14 (FIG. 4), as more fully described below. Thus, when the locking rod 20 is slid or moved into its locking position, the recess 20*c* is no longer aligned with the arm 12. Thus, the portion of the locking rod 20 adjacent the recess 20*c*, as noted, blocks or impedes rotation of the arm 12 toward its stowed condition, thereby locking the arm 12 in the deployed position, which effectively locks the door that is captured or impeded by the arm 12.

It should be understood that rather than having a recess that is formed by a notch in the outer circumference of the rod, the rod may be spaced sufficiently from the arm so that its outer circumference provides the offset to allow the barricade to return to its stowed position, but then has a raised surface (e.g. a cam surface) to block the arm from moving from its deployed position. In this manner, the receptacle is then formed adjacent or between raised surfaces as opposed to notches formed in the rod. However, a locking rod with notches allows for a more compact configuration.

As noted, base 14 is configured to straddle an edge of the door. Further, base 14 is positioned so that lock release actuator 16 is on one side of the base for locating the lock release actuator 16 inside the protected area, and with the lock release actuator 18 located on another side of the base for locating the lock release actuator 18 outside the protected area, as noted, where it is accessible by emergency personnel. Base 14, as noted may be flush mounted in a floor or wall. Further, to make the emergency egress safety system 10 more compact, all or most of the components, e.g. the barrier arms, the locking rod 20, lock release actuator 16, and lock release actuator 18 may be located within the footprint of the base, though locking rod 20 may be extended from the base as shown, for example in FIG. 1.

Further, as shown, access to the lock release actuators 16 and 18, as will be more fully described below, may be provided through the upper outer side of the base 14. In this manner, emergency egress safety system 10 may be configured as a unit or module that can be simple inserted into a recess formed in the floor under the door to be protected.

When emergency egress safety system 10 is surface mounted however, the actuators may be accessible through side ports formed or provided in the sides of the housing that is formed by base 14. Additionally, the inside lock release actuator 16 may be formed by a toggle or latch mounted at its exposed side so that it can be easily actuated with a foot or hand, though to reduce the chance so inadvertent actuation, it may be preferred to recess them so accidental release is avoided.

Figure 22:
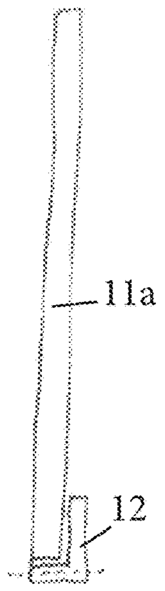
FIG. 22 is an elevation view of door with yet another embodiment of the emergency egress safety system shown in a deployed configuration adjacent an edge of the door.
Figure 23:
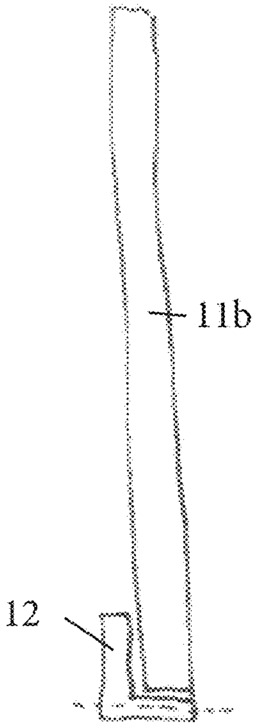
FIG. 23 is an elevation view of door with yet another embodiment of the emergency egress safety system shown in a deployed configuration adjacent an edge of the door.

As noted above, a single arm 12 may be used, as illustrated in FIG. 22, for an inwardly swinging or inswing door 11*a*. As would be understood arm 12 is raisable on the interior side of the door 11*a* to impede or barricade the door from opening inwardly. For another example, as illustrated in FIG. 23, for outwardly swinging or outswing doors 11*b*, a single arm 12 may be used that is raisable on the exterior side of the door 11*b* to impede or barricade the door from opening outwardly.

A suitable single arm may be a metal member with a rectangular cross-section, including a uniform cross-section with parallel opposing edges and, hence, be formed from a metal bar. However, the shape of the arms may be varied, such as noted below.

Figure 20:
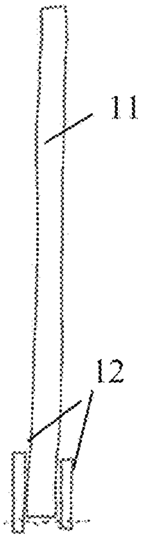
FIG. 20 is an elevation view of door with yet another embodiment of the emergency egress safety system shown in a deployed configuration adjacent an edge of the door.
Figure 21:
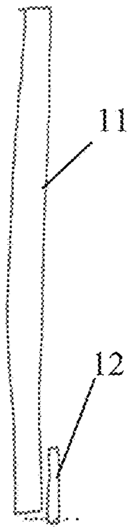
FIG. 21 is an elevation view of door with yet another embodiment of the emergency egress safety system shown in a deployed configuration adjacent an edge of the door.

Alternately, the arm may formed from an L-shaped member with two legs—with one of the legs pivotally mounting the arm 12 to the base 14 and the second leg providing the blocking function. In each case the leg may be formed from a metal bar with a uniform cross-section. Thus, the single arm 12 may include a portion that extends beneath the door in either single bar arrangements (FIGS. 22 and 23); however, it will be appreciated that the portion under the door may be omitted without substantially effecting the function of the barricade system. Examples of arm 12 without portions extending under the door are illustrated in FIGS. 20 and 21.

Further, as noted, the emergency egress safety system, as noted, may include two arms. For example, the two arms may be joined together and form a U-shaped member that straddles the edge of the door to be protected, or they may be independent and mounted to a respective pivot axle, with the pivot axle pivotally mounting the arm to the base. Thus, the arms may deployed together or independently. When deployed, the two arms are located on opposite sides of the door and capture the door there between when raised into their deployed and locked position. When formed from a U-shaped member, the two arms may be similarly formed from two bars that are joined by a transverse bar or by a rod through which the axle 22 extends to pivotally mount the U-shaped member, and hence arms, to the base. Alternately, two arms may be mounted by two axles 22 mounted to the opposed ends of transverse bar or rod.

Figure 6:
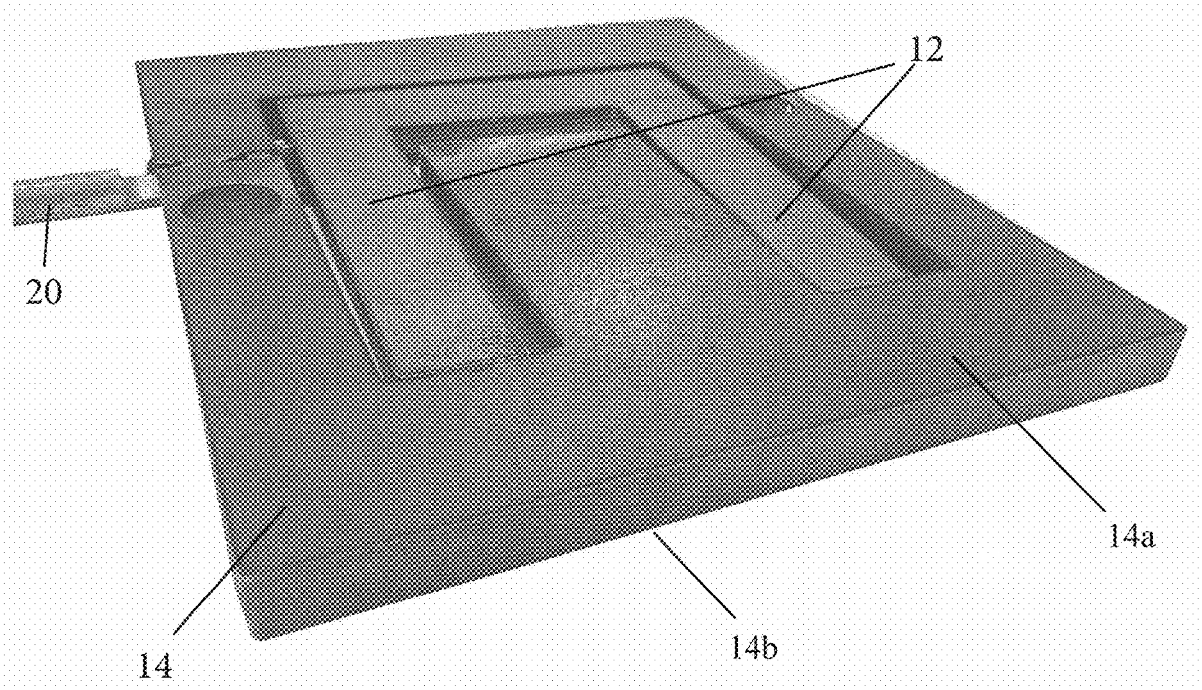
FIG. 6 is another perspective view of the emergency egress safety system shown in a stowed.
Figure 7:
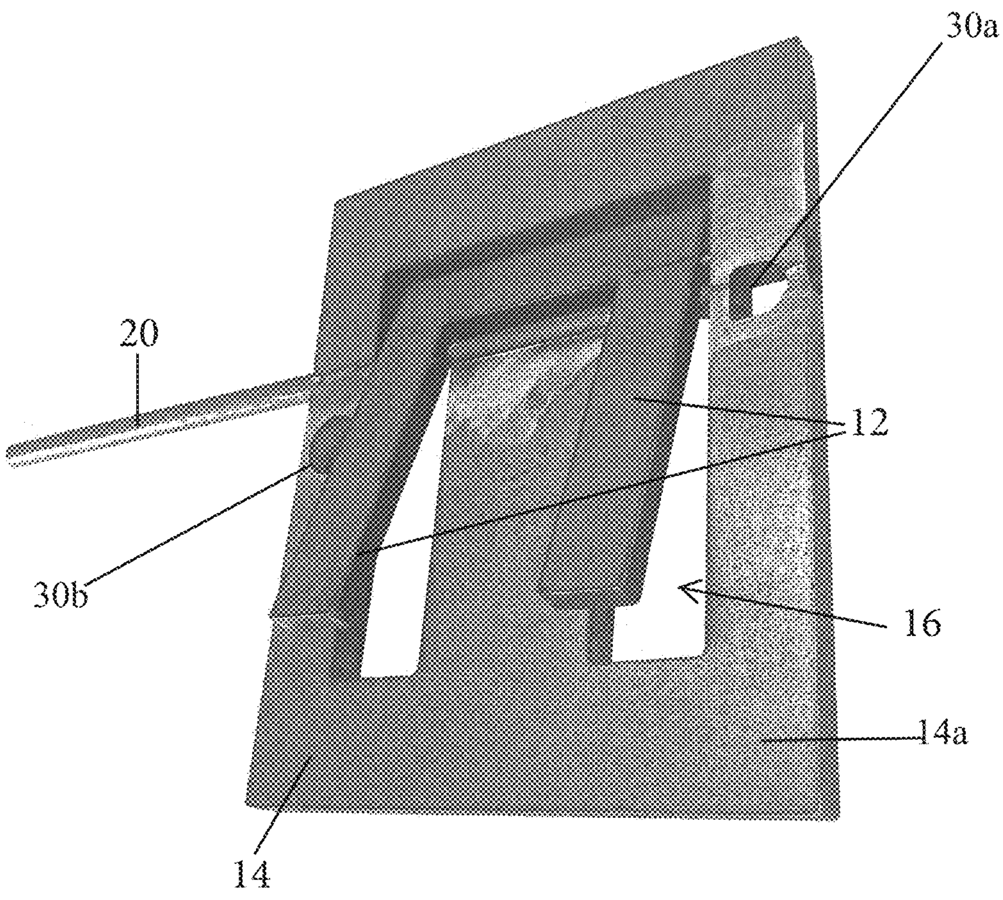
FIG. 7 is another perspective view of the emergency egress safety system shown in a partially deployed configuration.
Figure 9:
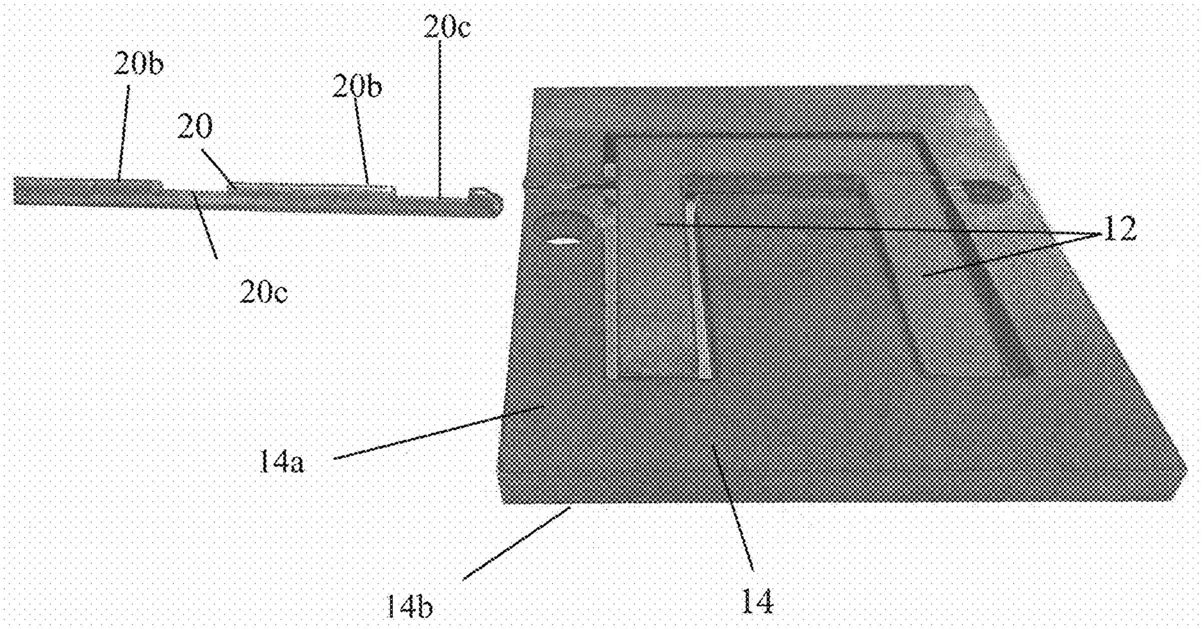
FIG. 9 is a partial exploded perspective view of the emergency egress safety.
Figure 10:
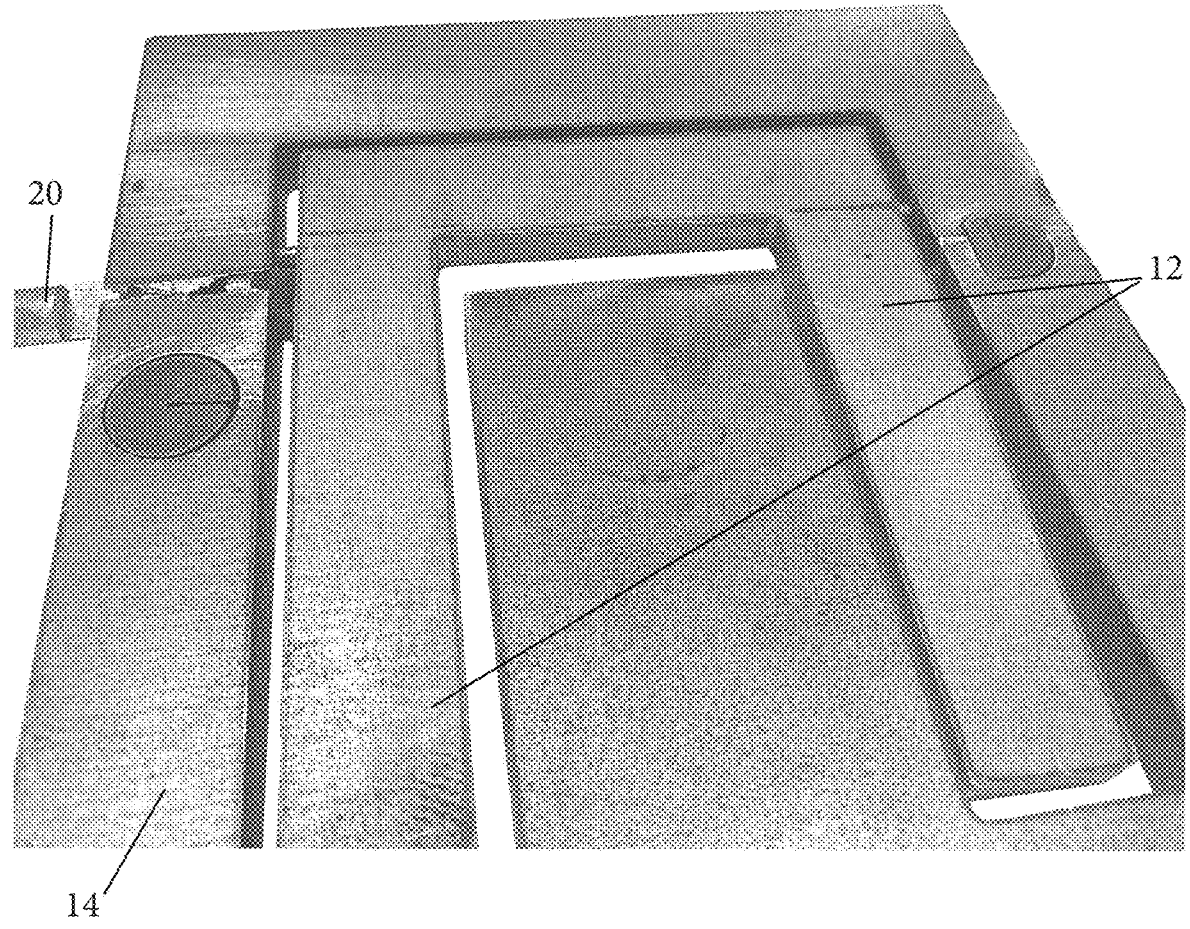
FIG. 10 is an enlarged view of the emergency egress safety shown in FIG. 9.
Figure 11:
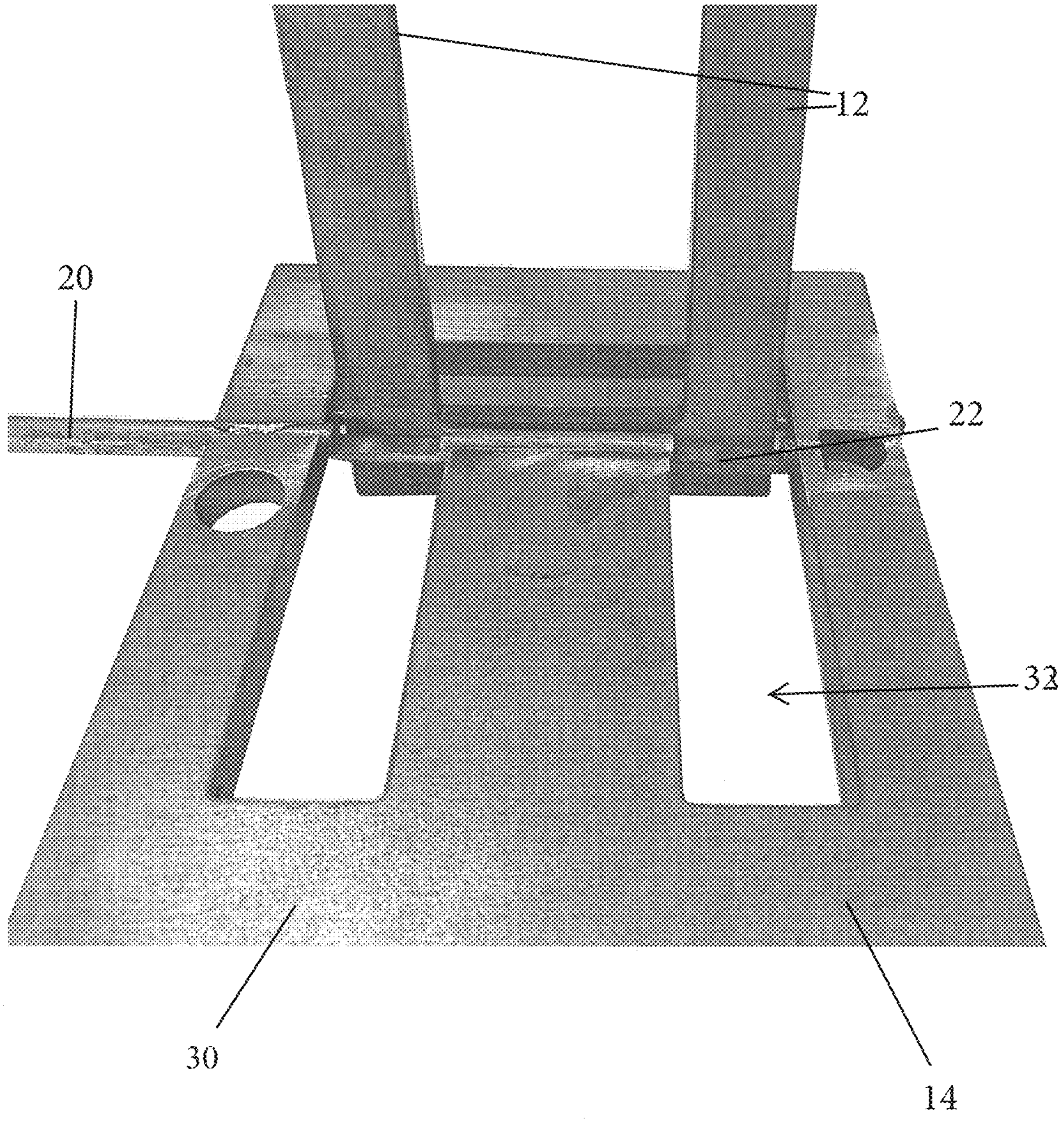
FIG. 11 is an enlarged perspective view of the emergency egress safety system shown in a deployed configuration.

In another aspect, as noted, the base 14 may have a footprint with the arm or arms remaining within the foot print of the base when deployed and when stowed. Further, as best seen in FIG. 6, the base may have an upper outer surface 14*a* and a lower outer surface 14*b*, with the arm or arms 12 pivotally mounted to the base 14 between the upper and lower outer surfaces 14*a*, 14*b* and moved and fully contained between the upper and lower outer surfaces when moved to its or their stowed positions, such as shown in FIGS. 6 and 9. Additionally, the arms 12 may be flush with the upper outer surface 14*a* of base when return to their stowed positions so that they lie flat in the base. Again, this allows for compact module with a low profile.

Figure 8:
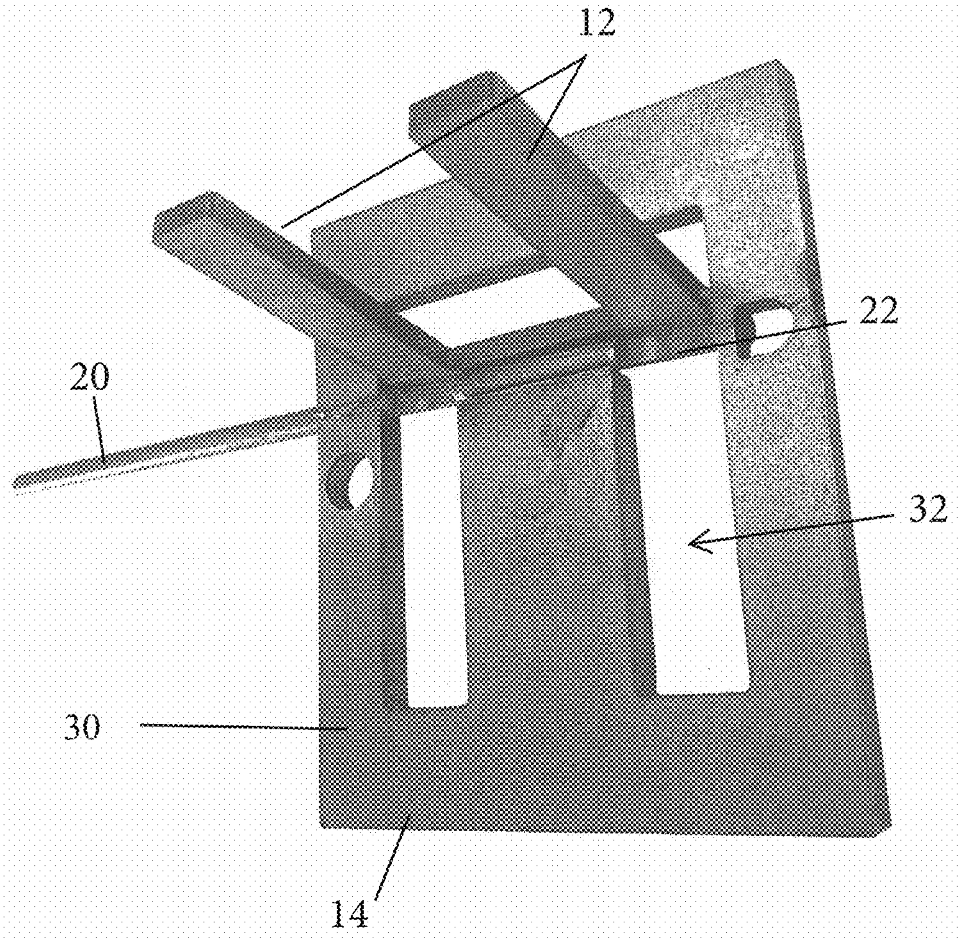
FIG. 8 is a another perspective view of the emergency egress safety system shown in a deployed configuration.

In a further aspect, the base 14 may comprise a plate 30 which defines the footprint and forms the upper and lower outer surfaces. As best seen in FIG. 8, plate 30 may have a recess 32, including a recess formed by a transverse opening that is sized and shaped to receive the arm or arms fully contained in plate 30 when the arm or arms are moved to their stowed positions.

In the illustrated embodiment where two arms that are joined to form a U-shaped member, recess 32 may have a U-shaped configuration to full circumscribe the U-shaped member. Further, as noted, the arm or arms may be moved to where they are flush with the upper outer surface 14*a* of the base 14 (e.g., plate 30) to form a compact and low profile emergency egress safety system that can be easily located under a door or in the wall surrounding the door so that it does not form an obstruction through the door.

Figure 24:
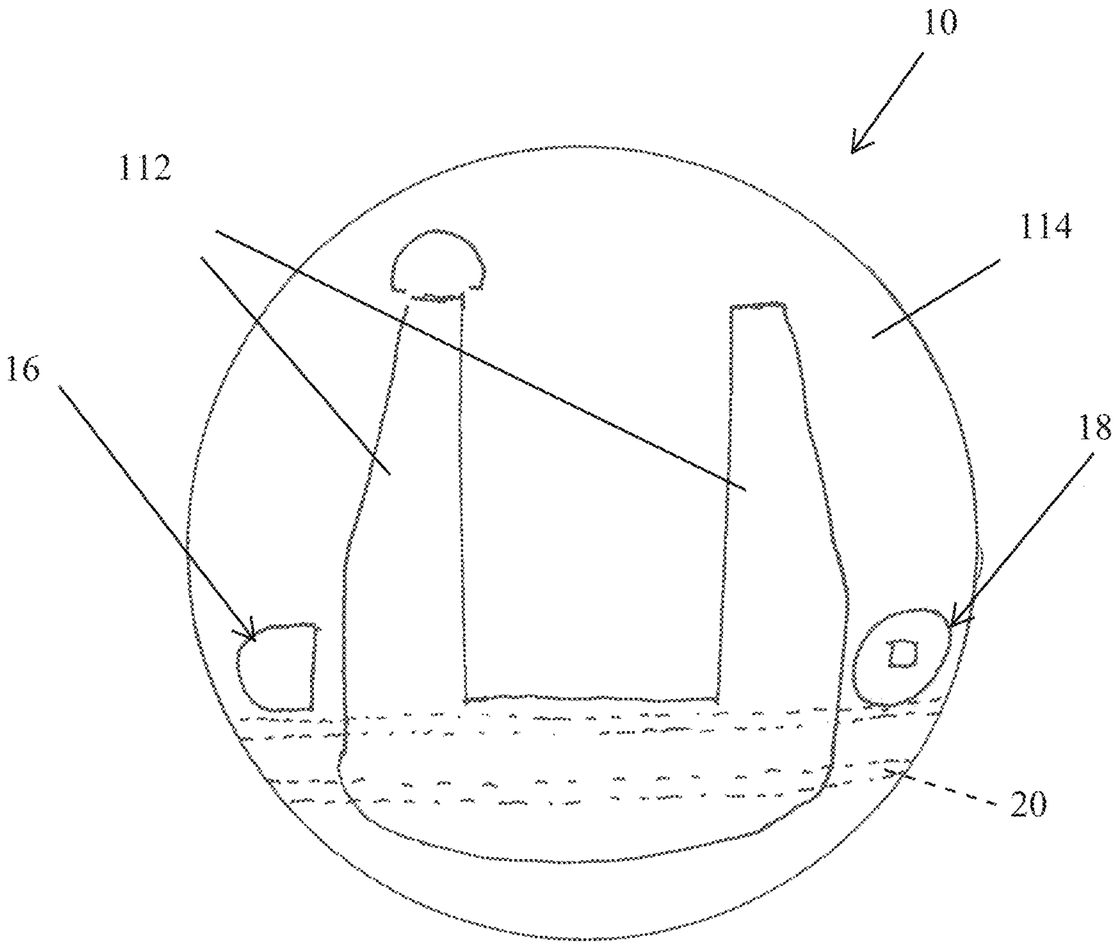
FIG. 24 is an enlarged detail of an arm of the emergency egress safety system.
Figure 25:
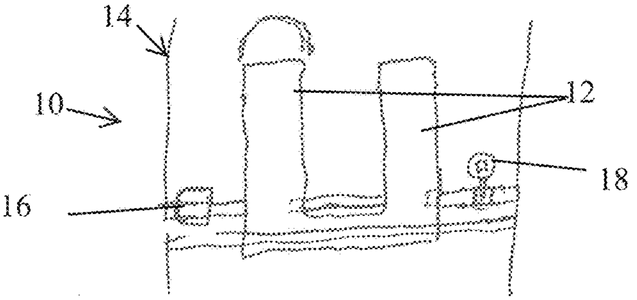
FIG. 25 is a plan view of the emergency egress safety system in a stowed configuration.
Figure 26:
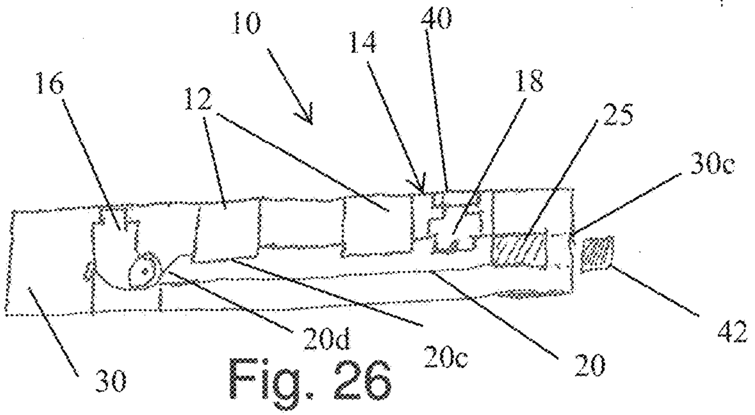
FIG. 26 is an enlarged cross-section of the emergency egress safety system of FIG. 25.
Figure 26A:
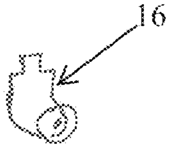
FIG. 26A is an enlarged view of a lock release actuator of the emergency egress safety system.
Figure 26B:
FIG. 26B is an enlarged view of another lock release actuator of the emergency egress safety system.
Figure 26C:
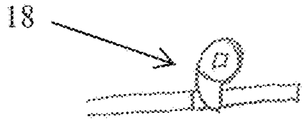
FIG. 26C is an enlarged view of another embodiment of a release actuator lock of the emergency egress safety system.
Figure 26D:
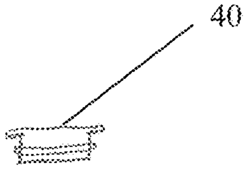
FIG. 26D is an enlarged view of an optional cap for an access point to the lock release emergency egress safety system.

While base 14 is depicted with a rectangular footprint, the system may incorporate a base 114 formed with a circular footprint, such as illustrated in FIG. 24, which may provide for simple installation in new construction and/or retrofit settings. Further, arms 112 may tapered metal plates maximize their length while still able to be contained within the base when returned to their stowed positions, and still provide sufficient shear strength at or near the base of each arm.

Referring to FIGS. 25, 26, and 26A-26D, as noted above, the emergency egress safety system 10 may include one or two lock release actuators 16, 18—one located (by the base) inside the protected room, and the other located by the base outside the protected room. Lock release actuator 16 may be a spring biased button, including a recessed or flush spring biased button that when pressed moves the locking rod to is non-locking position. For example, the spring biased button may have contact surface, such as cam surface or contact roller that is positioned to engage a cam surface 20*d* provided on the end of locking rod 20 so that when pressed, the spring biased button will urge locking rod 20 to move against the force of spring 25 and move the engagement surfaces 20*b* out of alignment with arms 12, thereby allowing the arms 12 to return to their stowed position.

Lock release actuator 16, which forms an interior release mechanism, is optionally located in a recess 30*a* (FIG. 7) in plate 30 so that it too is contained within plate 30 and, hence, base 14. Additionally, the recess 30*a* may be located on upper outer side 14*a* of base so that should base 14 be recessed in the mounting surface (e.g., floor or wall), the lock release actuator 16 is still accessible. It should be understood that when emergency egress safety system 10 is not configured as a flush mount unit or module, the recess may be located on a side of the base.

Lock release actuator 18, which forms an exterior release mechanism, may be comprise a lock that accepts only a unique tool or access system that permits authorized personal to move the locking rod and unlock the barricade, while still thwarting unauthorized individuals from readily disengaging the system 10 to gain access to the protected room. For example, the unique access tool may include a key with a unique configuration. The exterior release mechanism may be configured to operate with a unique sequence in order to move the locking rod 20. For example, the lock may be configured to require user to press (e.g. against a spring) and rotate the lock in order for the lock to move the locking rod to its non-locking position.

Again, lock release actuator 18 is optionally located in a recess 30*b* (FIG. 7) in plate 30 so that it too is contained within plate 30 and, hence, base 14. Additionally, the recess 30*b* may be located on upper outer side 14*a* of base so that should base 14 be recessed in the mounting surface (e.g., floor or wall), the lock release actuator 18 is still accessible. It should be understood that when emergency egress safety system 10 is not configured as a flush mount unit or module, the recess may be located on a side of the base.

Caps, covers, or beauty covers may be provided to cover an aspect of the system, including a cap or plug 40 to cover at least access opening 30*b* and a plug 42 to cover the opening 30*c* in plate where the spring 25 is insert to engage locking rod 20, to enhance the aesthetic qualities of the system and/or deter or mask aspects of the system from unauthorized users.

As described, the system 10 may, therefore, include an interior lock release mechanism to permit a user to release the lock from inside the protected room. The interior release may include a push button that is automatically raised or presented when the arm 12 is raised and/or when the rod is engaged in the locking position. Thus, the user on the interior of the door may readily disengage the barricade to permit the door 11 to swing freely in a normal fashion.

As described, the system 10 may, therefore, include an exterior lock release or exterior access point to an internal lock release to permit authorized personal to disengage or unlock the system from the exterior or the protected room, such as in the event of a fire or other emergency when egress must be restored via the doorway. The exterior lock release preferably includes an automatic return or disengagement member that moves the locking rod 20 from its locked position to its non-locking position, permitting the arm or arms 12 to move from the deployed position to the stowed position.

As noted, the exterior release preferably includes a lock, such as unique lock, that accepts only a unique tool or access system that permits authorized personal to unlock the barricade, while still thwarting unauthorized individuals from readily disengaging the system 10 to gain access to the protected room. For example, the unique access tool may include a key with a unique configuration. The exterior release mechanism may be configured to operate with a unique sequence in order to disengage the rod 20. For example, a user may be required to know the proper unlocking procedure, such as inserting the access tool into the access element, then pushing the tool downward, and then turning the tool to unlock the lock. This unique procedure may be sufficient to deter an unauthorized person from unlocking the system from the exterior of the protected room. The procedure may at a minimum require an unauthorized user to spend time attempting to unlock the system, which during that time, the unauthorized user is not performing in dangerous activities. This time period may provide emergency responders to disarm or otherwise engage the unauthorized user before any or more dangerous activities occur.

Figure 13:
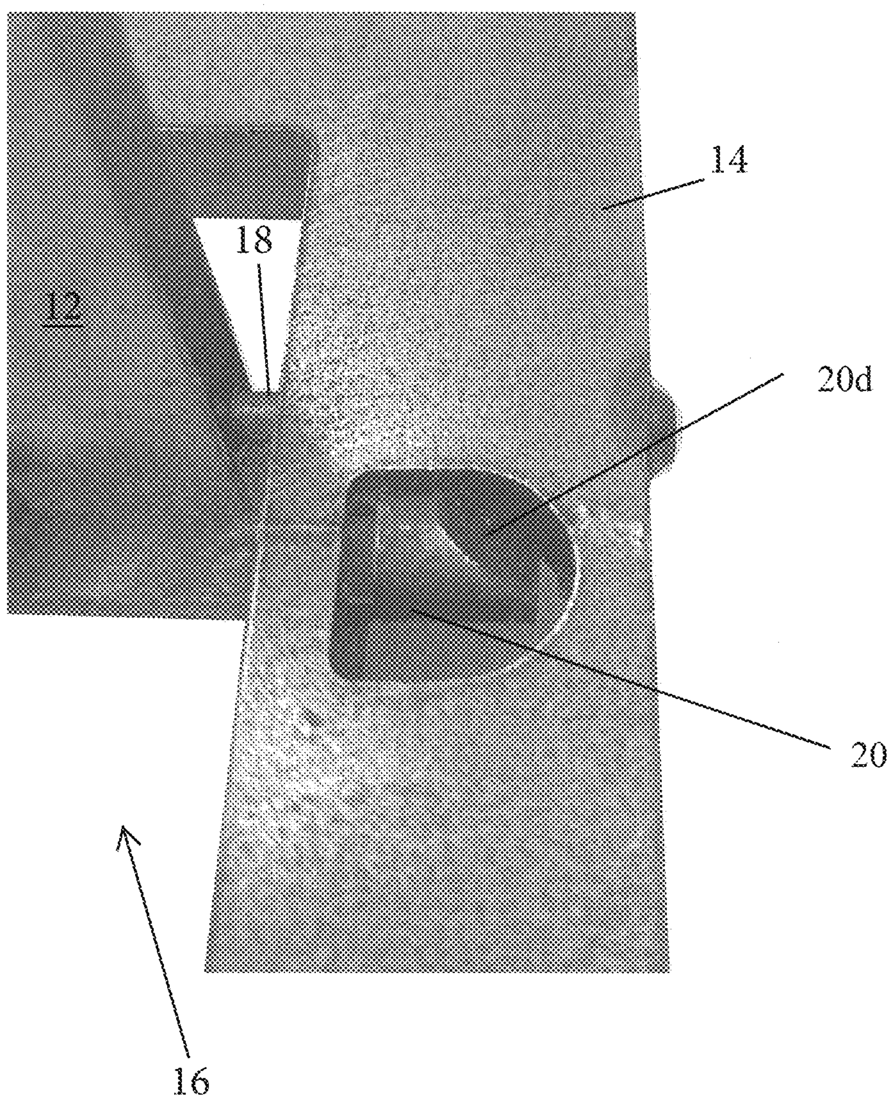
FIG. 13 is another enlarged perspective view of the emergency egress safety system shown in a deployed configuration.

The system 10 may be operated with a method, including a user raising the arm 12 from the stowed condition into the barricade condition, the user manually activating a locking member or the system automatically engaging a locking member to lock the arm 12 in the barricade condition. Once a threat or emergency situation is resolved, the method may include a user disengaging the barricade from the interior of the door 11 by depressing or otherwise operating an interior release mechanism or a user disengaging the barricade from the exterior of the door by operating an exterior release mechanism at the exterior access point. Either or both of the interior release and exterior release mechanisms may utilize a plunger arrangement to operate or urge the rod 20 to move in a particular direction. Chamfers or other machining techniques may be utilized (see FIG. 13 depicting a chamfered end of the slideable locking rod 20), to form the release mechanisms. It will be appreciated that commonly known or commercially available actuation mechanisms and lock systems may be utilized to active or actuate the locking rod 20 or other aspects of the system 10.

It should be understood that powered and remote control over emergency egress safety system 10 may be provided by incorporating conventional powered actuators (along with a power source or wiring for connection to a power source) for any of the actuators noted here in and a controller in communication with the powered actuators with a receiver or transceiver to receive control signals from a local device (such as a button, for example with the protected room) or from a remote device, such as a handheld remote device or a server. Further, sensors may be incorporated into the emergency egress safety system 10 (which are in communication with the controller) so that the state (e.g. deployed or not deployed) of the arms may be detected and notifications dispatched by the controller via the transceiver to a remote device, such as a handheld remote device or a server, including an offsite server, for example, at an emergency facility. One or more lights may be incorporated into the emergency egress safety system 10 to provide a status of the system (e.g. locked or unlocked) and/or simply to identify the emergency egress safety system 10, for example, in low light or no light condition. To that end an onboard battery may be provided to power the light(s), and any of the electronics or powered actuators noted herein.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. An emergency egress safety system for a door to a protected room, the emergency egress safety system comprising:

a base, the base for straddling an edge of a door and having a first portion for locating on a side of the door facing outside the protected room and a second portion for locating on a side of the door facing the protected room;

an arm mounted relative to the base, the arm being mounted to the base for movement between a stowed position and a deployed position where the arm is extended from the base and is automatically locked in the deployed position to block the door that is straddled by the base;

a locking rod mounted in said base and movable between a non-locking position and a locking position, the locking rod having an engagement surface, when the locking rod is in the locking position the engagement surface is aligned with the arm to block the arm returning to its stowed position and when the locking rod is moved to the non-locking position the engagement surface is no longer aligned with the arm and the alarm is allowed to return to its stowed position;

a first actuator located at the first portion operable to unlock the arm to allow the arm to return to its stowed position, the base having an upper outer side, and the first actuator accessible through said upper outer side, wherein the arm and the first actuator are fully contained within the base when the arm is returned to its stowed position; and a second actuator operable to unlock the arm to allow the arm to return to its stowed position, the second actuator being fully contained within the base.

2. The emergency egress safety system according to claim 1, further comprising a second arm mounted relative to the base, the second arm being mounted to the base for movement between a stowed position and a deployed position where the second arm is extended from the base and is automatically locked in the deployed position to block the door that is straddled by the base.

3. The emergency egress safety system according to claim 2, wherein the first and second arms are joined together and form a U-shaped member.

4. The emergency egress safety system according to claim 3, wherein said base comprises a plate.

5. The emergency egress safety system according to claim 1, further comprising a biasing member to bias the locking rod to its locking position.

6. The emergency egress safety system according to claim 1, wherein the arm is mounted for pivotal movement relative to the base about a pivot axis, and the locking rod is mounted to the base adjacent the arm offset from the pivot axis for linear movement along a longitudinal axis parallel to the pivot axis from the non-locking position to the locking position when the arm is pivoted to its deployed position to thereby lock the arm in its deployed position.

7. The emergency egress safety system according to claim 1, wherein the base has an upper outer surface and a lower outer surface, with the arm pivotally mounted to the base between the upper and lower outer surfaces and moved and fully contained between the upper and lower outer surfaces when moved to its stowed position.

8. The emergency egress safety system according to claim 1, wherein the base has an upper outer surface and a lower outer surface, the arm being flush with the upper outer surface when moved to its stowed position.

9. An emergency egress safety system for a door to a protected room, the emergency egress safety system comprising:

a base, the base comprising a plate for straddling an edge of a door and having a first portion for locating on a side of the door facing outside the protected room and a second portion for locating on a side of the door facing the protected room, and the plate having a recess;

an arm mounted in the recess of the plate for movement between a stowed position fully contained within the plate and a deployed position where a portion of the arm is extended above the plate to form a barrier for the door;

a locking rod mounted in said plate and movable between a non-locking position and a locking position, the locking rod having an engagement surface, when the locking rod is in the locking position the engagement surface is aligned with the arm to block the arm returning to its stowed position and when the locking rod is moved to the non-locking position the engagement surface is no longer aligned with the arm and the arm is allowed to return to its stowed position;

a first actuator operable to move the locking rod from the locking position to the non-locking position to allow the arm to return to its stowed position, the first actuator being located at the first portion of the plate, the plate having an upper outer side, and the first actuator accessible though the upper outer side, wherein the arm, the first actuator, and at least a portion of the locking rod are fully contained within the plate when the arm is returned to its stowed position; and a second actuator operable to unlock the arm to allow the arm to return to its stowed position, the second actuator being fully contained within the plate.

10. The emergency egress safety system according to claim 9, wherein the locking rod is biased into its locking position.

11. The emergency egress safety system according to claim 10, wherein when the arm is in its stowed position, the arm blocks the locking rod from moving to its locking position until the arm is moved to is deployed position.

* * * * *